US010797560B1

United States Patent
Siddiqui et al.

(10) Patent No.: US 10,797,560 B1
(45) Date of Patent: Oct. 6, 2020

(54) HYBRID/ELECTRIC VEHICLE TRANSMISSION

(71) Applicant: Ford Global Technologies, LLC, Dearborn, MI (US)

(72) Inventors: Siraj Siddiqui, Lasalle (CA); Cyrille Goldstein, Ferndale, MI (US); William David Guarino, Dearborn, MI (US); Michael Coury, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 16/396,932

(22) Filed: Apr. 29, 2019

(51) Int. Cl.
| | |
|---|---|
| *H02K 5/15* | (2006.01) |
| *H02K 5/24* | (2006.01) |
| *H02K 1/18* | (2006.01) |
| *H02K 7/00* | (2006.01) |
| *F16B 4/00* | (2006.01) |
| *F16B 5/02* | (2006.01) |
| *B60K 6/26* | (2007.10) |

(52) U.S. Cl.
CPC .............. *H02K 5/24* (2013.01); *F16B 4/004* (2013.01); *F16B 5/0241* (2013.01); *H02K 1/185* (2013.01); *H02K 7/006* (2013.01); *B60K 6/26* (2013.01); *B60Y 2200/91* (2013.01); *B60Y 2200/92* (2013.01); *B60Y 2400/60* (2013.01)

(58) Field of Classification Search
CPC ................................. H02K 5/15; H02K 7/006
See application file for complete search history.

(56) References Cited

U.S. PATENT DOCUMENTS

| | | | | |
|---|---|---|---|---|
| 3,344,291 | A * | 9/1967 | Pratt ...................... | H02K 7/145 310/50 |
| 3,476,960 | A * | 11/1969 | Rees ........................ | B25F 5/02 310/50 |
| 3,693,035 | A * | 9/1972 | Ostwald ................. | H02K 1/185 310/51 |
| 5,629,575 | A * | 5/1997 | Cazal ...................... | H02K 5/15 310/263 |
| 6,129,176 | A | 10/2000 | Hunsberger et al. | |
| 6,528,918 | B2 * | 3/2003 | Paulus-Neues ......... | F02N 11/04 310/75 R |
| 8,097,997 | B2 * | 1/2012 | Mizuno ................... | B60L 50/61 310/216.131 |
| 9,118,228 | B2 | 8/2015 | Knight et al. | |

* cited by examiner

*Primary Examiner* — Dang D Le

(74) *Attorney, Agent, or Firm* — David Kelley; Brooks Kushman P.C.

(57) ABSTRACT

A vehicle transmission includes a housing, an electric machine, a bracket, and a plurality of fasteners. The housing has internal rear and internal side walls that define a cavity. The electric machine stator and the bracket are disposed within the cavity. The bracket has a metallic inner ring and an elastomer outer ring. The elastomer outer ring engages the internal side wall. The electric machine stator is disposed between the bracket and the internal rear wall. The plurality of fasteners extends through the metallic inner ring, through the stator, and engages the rear internal wall to secure the stator to the housing.

18 Claims, 4 Drawing Sheets

US 10,797,560 B1

HYBRID/ELECTRIC VEHICLE TRANSMISSION

TECHNICAL FIELD

The present disclosure relates to transmissions for hybrid/electric vehicles that include an electric machine such as a motor, generator, or combination motor/generator.

BACKGROUND

Hybrid and/or electric vehicles may include electric machines that are disposed within a housing, such as a transmission or transaxle housing.

SUMMARY

A vehicle transaxle includes a housing, an electric machine stator, a mounting bracket, and fasteners. The housing has first and second internal walls that define a cavity. The electric machine stator is disposed within the cavity. The mounting bracket is disposed within the cavity and has an elastic outer portion that engages the first internal wall. The stator is disposed between the mounting bracket and the second internal wall. The fasteners extend through the mounting bracket, through the stator, and engage the second internal wall to secure the stator to the housing.

A vehicle transmission includes a housing, an electric machine, a bracket, and a plurality of fasteners. The housing has internal rear and internal side walls that define a cavity. The electric machine stator and the bracket are disposed within the cavity. The bracket has a metallic inner ring and an elastomer outer ring. The elastomer outer ring engages the internal side wall. The electric machine stator is disposed between the bracket and the internal rear wall. The plurality of fasteners extends through the metallic inner ring, through the stator, and engages the rear internal wall to secure the stator to the housing.

A vehicle transmission includes a housing, a stator, and a mounting bracket. The housing has an internal rear wall and a cylindrical side wall. The cylindrical side wall defines an annular groove. The stator and mounting bracket are disposed within the housing. The mounting bracket has an elastic outer portion. The stator is disposed between the internal rear wall and the mounting bracket. An external periphery of the elastic outer portion of the mounting bracket engages the internal cylindrical side wall within the annular groove.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
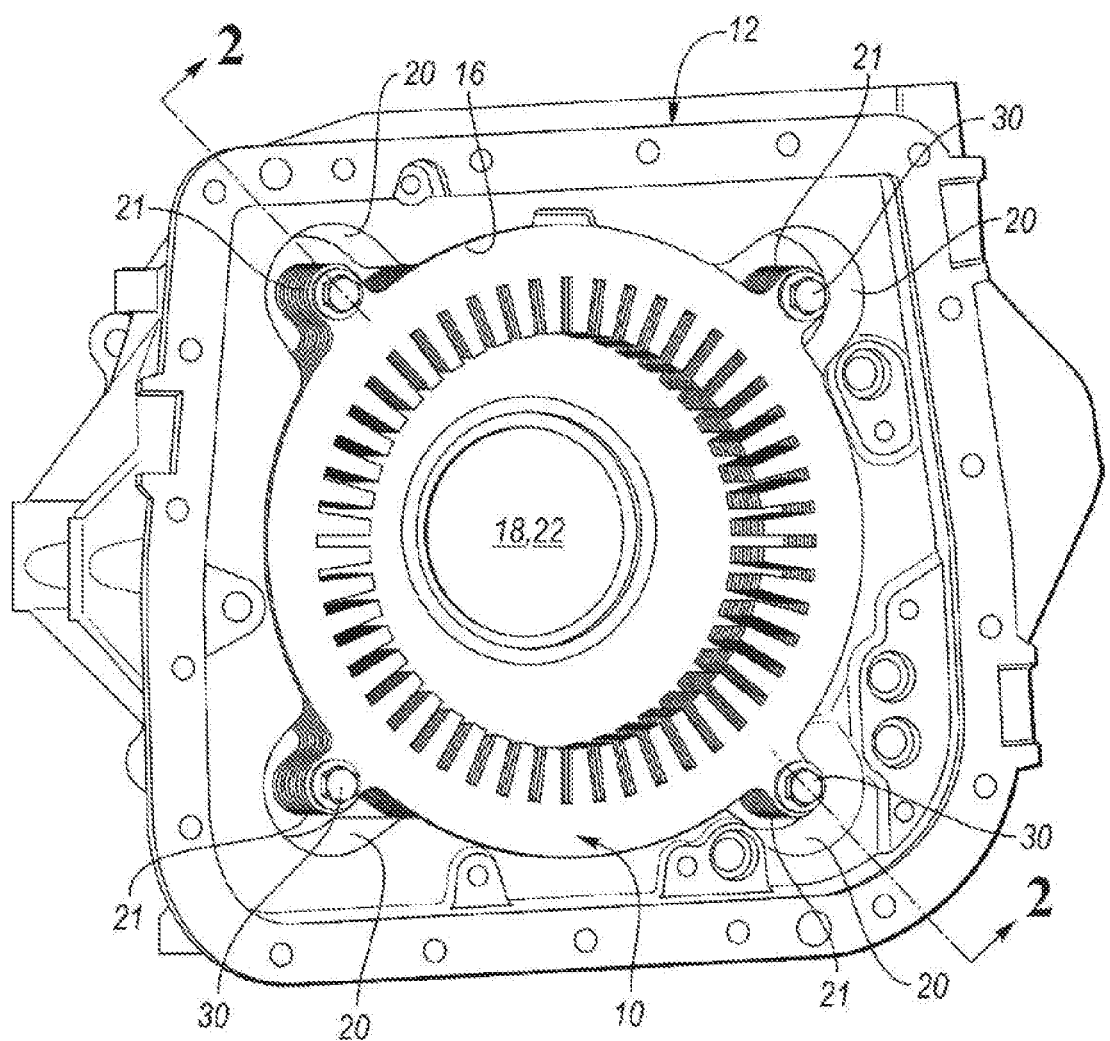
FIG. 1 is a front isometric view of an electric machine stator that is disposed within a housing illustrating a first mounting arrangement for the electric machine stator.
Figure 2:
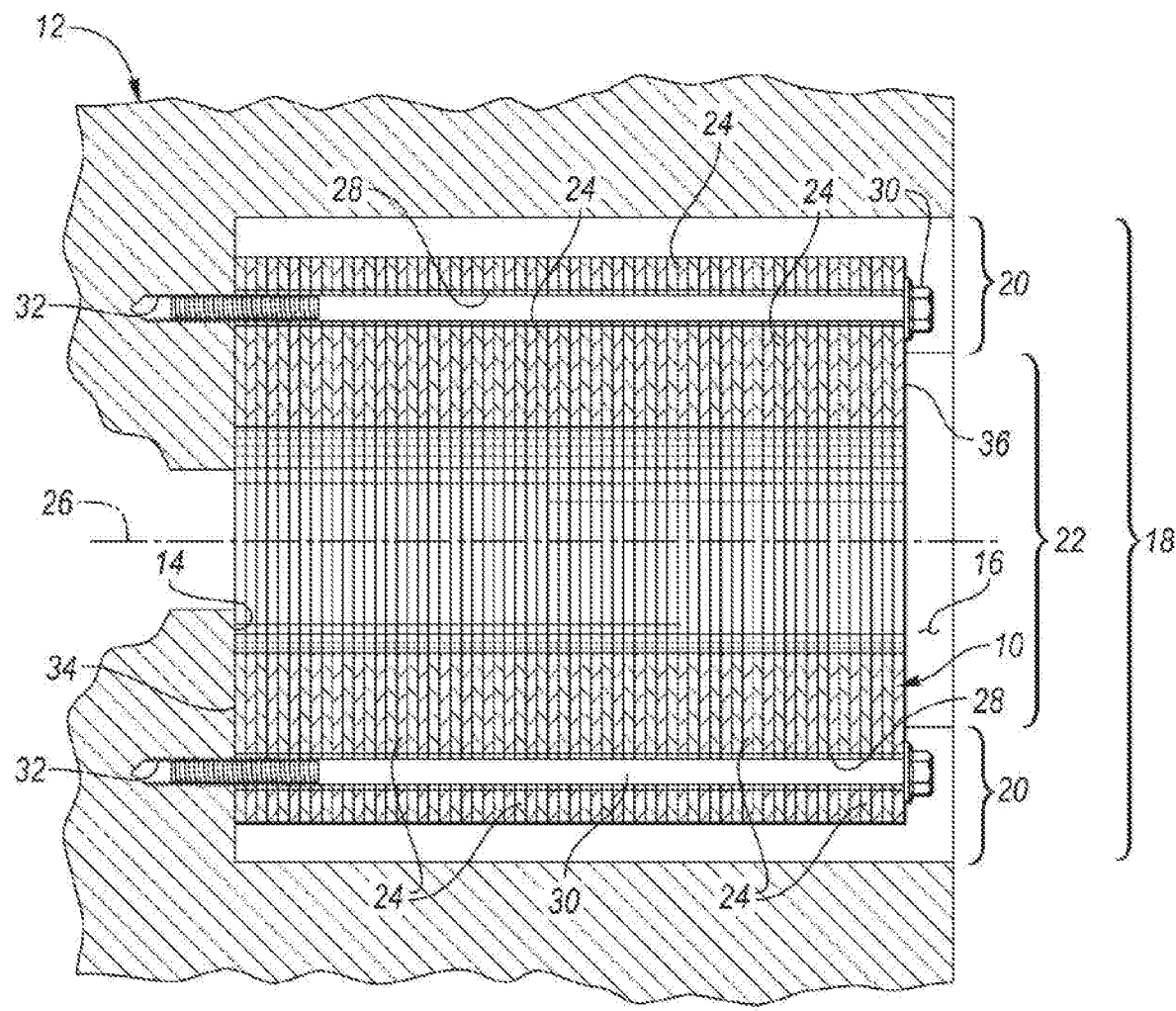
FIG. 2 is a cross-sectional view taken alone line 2-2 in FIG. 1.

Referring to FIGS. 1 and 2, a front isometric view of an electric machine stator 10 that is disposed within a housing 12 and a cross-sectional view taken along line 2-2 in FIG. 1 are illustrated, respectively. More specifically, FIGS. 1 and 2 illustrate a first and/or conventional mounting arrangement for the electric machine stator 10.

The electric machine stator 10 and the housing 12 may be subcomponents of a vehicle. More specifically, the electric machine stator 10 and the housing 12 may be subcomponents of a vehicle powertrain that is configured to deliver power to wheels to propel the vehicle. The housing 12 may be a transmission or transaxle housing that contains transmission and/or transaxle components such as gear sets, clutches, brakes, differentials, driveshafts, half shafts, etc. The gear sets may be selectively placed in different gear ratios by selective engagement of friction elements, such as the clutches and brakes, to establish desired multiple discrete or step drive ratios.

The electric machine stator 10 may be the stator of an electric machine that includes both a stator and a rotor. The electric machine may draw power from a battery and operate as a motor to provide a driving force for the powertrain of the vehicle. Alternatively, the electric machine may operate as a generator and convert kinetic energy from the powertrain of the vehicle into electric energy to be stored in the battery or to power other electrical components within the vehicle. If the vehicle is a hybrid vehicle that includes an additional power source, such as an internal combustion engine, the electric machine may operate as a generator while the other power source is providing propulsion power for the vehicle, for example. The electric machine may additionally operate as a generator during times of regenerative braking in which torque and rotational energy or power from spinning drive wheels of the vehicle is transferred back through the powertrain and to the electric machine, which then converts the rotational energy into electrical energy, which may then be stored within the battery or to power other electrical components within the vehicle.

In the first and/or conventional mounting arrangement for the electric machine stator 10, the housing 12 includes an internal rear wall 14 and an internal side wall 16 that define a cavity 18. The internal rear wall 14 and the internal side wall 16 may be referred to as the first and second internal walls, respectively, or vice versa. The internal rear wall 14 may be a flat and substantially planar wall while the internal side wall 16 may be cylindrical in shape. Substantially planar may include a flat surface that ranges from a perfectly flat along a designated flat plane to a flat surface that includes deviations of up to 3 mm from such a designated flat plane. The internal rear wall 14 and the internal side wall 16 may be substantially perpendicular to each other. Substantially perpendicular may include any incremental value between 80° and 100°. The cavity 18 may also include lobes 20 that extend radially outward from a central portion 22 of the cavity 18. The lobes 20 may be defined by the internal side wall 16. The lobes 20 provide clearance for radially outward extending protrusions 21 of the electric machine stator 10 that define through holes that are configured to received fasteners (see 28 and 30 below).

The electric machine stator 10 may be comprised of a plurality of laminate plates 24 that are sequentially stacked in an axial direction along an axis of rotation 26 of the rotor (not shown) of the electric machine. The laminate plates 24 are individually fabricated from a material such iron or steel. The laminate plates 24 are then aligned in an axial direction along the axis of rotation 26 to form the core of the electric machine stator 10. The electric machine stator 10 also includes coil windings that are not depicted in the Figures for simplicity purposes. The laminate plates 24 may be stacked "loose", welded, or bonded together depending the desired application. The laminate plates 24 may include a thin layer of insulating material (e.g., a thin layer of epoxy that is approximately 0.001 mm thick). Although not depicted in FIGS. 1 and 2, there may be small spaces between adjacent laminate plates 24 at locations where the adjacent laminate plates 24 are not affixed to each other, if the application requires the adjacent laminate plates 24 to be affixed to each other (i.e., via welding or bonding).

The laminate plates 24 of the electric machine stator 10 may define a plurality of through holes 28 that are each configured to receive one of a plurality of fasteners 30. The internal rear wall 14 of the housing 12 may define a plurality of tapped holes 32 that are each configured to align with one of the plurality of through holes 28 and engage the one of the fasteners 30. More specifically, each of the fasteners 30 may extend through one of the through holes 28 and engage one of the tapped holes 32 to secure the electric machine stator 10 to the housing 12 and within the cavity 18. The fasteners 30 may also function to properly align the plurality of laminate plates 24 to form the core of the electric machine stator 10 if the application requires the adjacent laminate plates 24 to be stacked in a "loose" configuration.

In the first and/or conventional mounting arrangement for the electric machine stator 10 depicted in FIGS. 1 and 2, the fasteners 30 secure the electric machine stator 10 to the housing 12 and within the cavity 18 in cantilevered fashion (i.e., a first longitudinal end 34 of the electric machine stator 10 along the axis of rotation 26 is secured to the housing 12 while a second longitudinal end 36 of the electric machine stator 10 along the axis of rotation 26 is not secured to any static component that is grounded or anchored to the housing 12), which may lead to undesirable noise, vibration, or harshness (NVH) issues. Therefore, in order reduce or eliminate any undesirable NVH issues, it may be desirable to support the electric machine stator 10 on both longitudinal ends 34, 36 to increase the stiffness of the electric machine stator 10, which in turn will reduce or eliminate any undesirable NVH issues. It is also desirable to ensure that there is no additional stress is induced within the core of the electric machine stator 10 as a result of adding a mechanism that mounts both ends of the electric machine stator 10 to the housing 12. Insufficient stiffness will result in undesired noise and vibrations, while additional stress on the core of the electric machine stator 10 will result in core losses, which in turn reduces the efficiency of the electric machine. Reduced efficiency decreases the range that electric or hybrid vehicles may utilize the electric machine for propulsion and decreases the fuel economy in hybrid vehicles that utilize the electric machine for propulsion.

Figure 3:
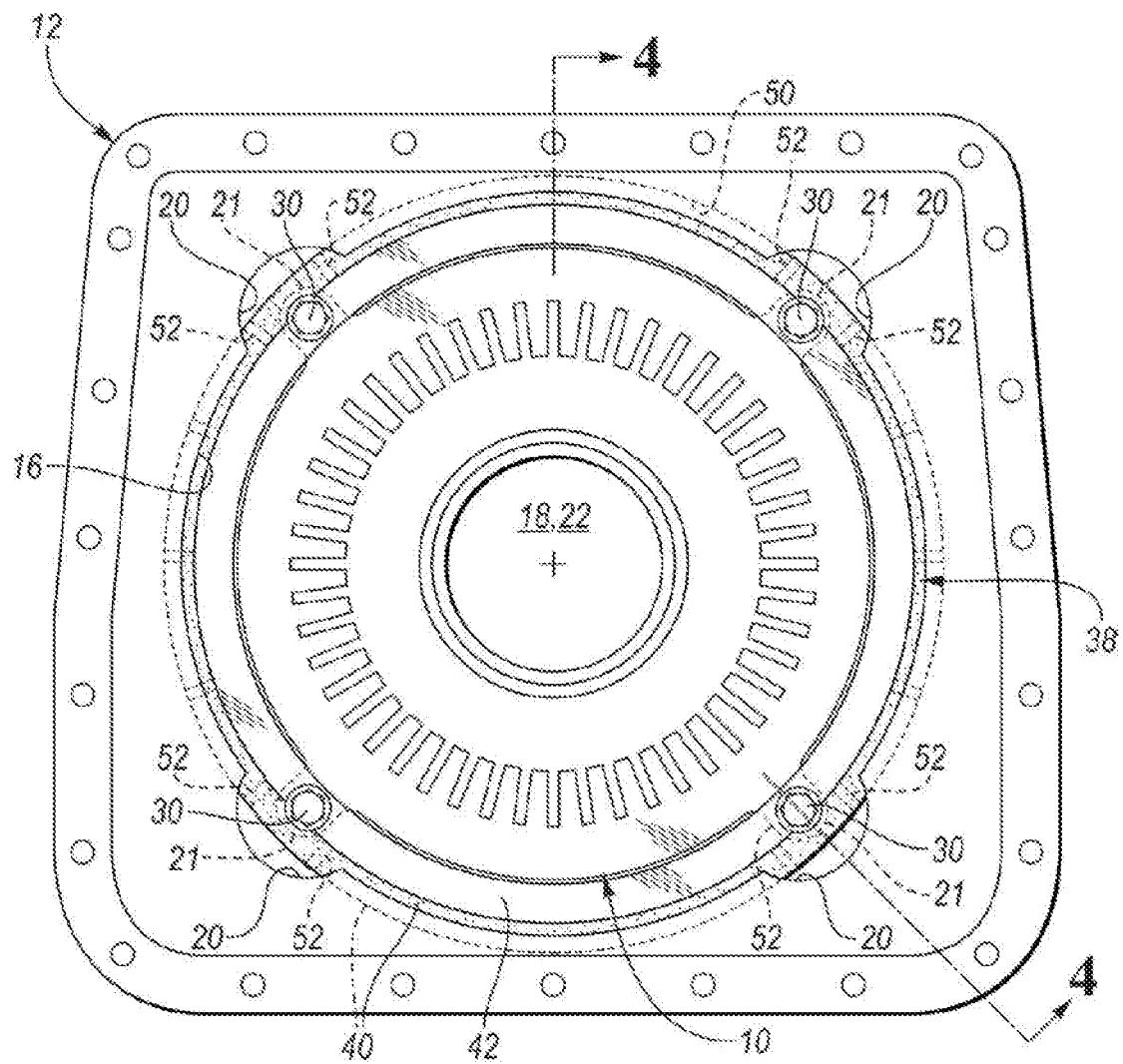
FIG. 3 is a front view of the electric machine stator that is disposed within the housing illustrating a second mounting arrangement for the electric machine stator.
Figure 4:
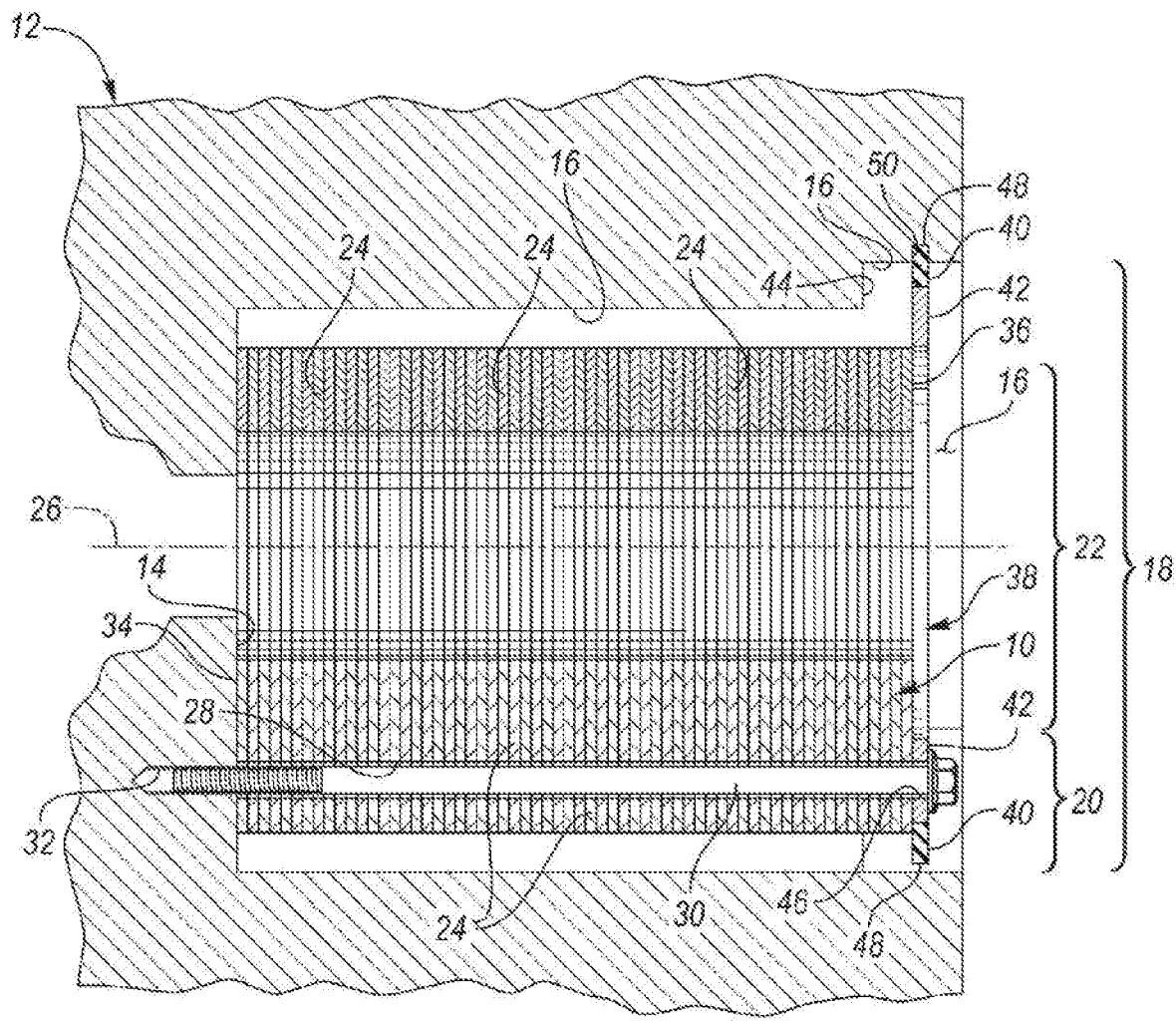
FIG. 4 is a cross-sectional view taken alone line 4-4 in FIG. 3.

Referring to FIGS. 3 and 4, a front view of the electric machine stator 10 that is disposed within the housing 12 and a cross-sectional view taken along line 4-4 in FIG. 3 are illustrated, respectively. More specifically, FIGS. 3 and 4 illustrate a second mounting arrangement for the electric machine stator 10, where the electric machine stator 10 is supported on both the longitudinal ends 34, 36 for the purpose of increasing stiffness to reduce or eliminate potential NVH issues. The second mounting arrangement depicted in FIGS. 3 and 4 also does not induce addition stress on the core of the electric machine stator 10 since the same number of fasteners 30 are utilized to secure the electric machine stator 10 to the housing 12 with respect to the first and/or conventional mounting arrangement, resulting in no additional compressive stress on the core of the electric machine stator 10. It should be understood that the components depicted in FIGS. 3 and 4 that were also depicted in FIGS. 1 and 2 will have the same properties, characteristics, functionality, etc. unless otherwise specifically stated herein.

In the second mounting arrangement for the electric machine stator 10, a mounting bracket 38 is disposed within the cavity 18. The mounting bracket 38 has an elastic outer portion 40 that engages the internal side wall 16. More specifically, the mounting bracket 38 includes a metallic inner ring 42 and an elastomer outer ring that comprises the elastic outer portion 40. The elastomer outer ring that comprises the elastic outer portion 40 of the mounting bracket 38 may be disposed over (e.g., radially outward from) or disposed about the metallic inner ring 42. More specifically, the elastomer outer ring may be overmolded onto the metallic inner ring 42. The electric machine stator 10 is disposed between the between the mounting bracket 38 and the internal rear wall 14 of the housing 12. The first longitudinal end 34 of the electric machine stator 10 may engage and/or may be secured to the internal rear wall 14 of the housing 12 while the second longitudinal end 36 may engage and/or may be secured to the mounting bracket 38. The internal side wall 16 of the housing 12 may include a step 44. A perimeter or diameter of the cavity 18, which is defined by the internal side wall 16, may decrease in size along the step 44. More specifically, the perimeter or diameter of the cavity 18 may be smaller along an end of the housing 12 that is adjacent to the internal rear wall 14 relative to an opposing side of the housing 12 where the mounting bracket 38 is disposed. The mounting bracket 38 may engage the portion of the internal side wall 16 that defines the portion of the cavity 18 that has the larger perimeter or diameter.

Each of the plurality of fasteners 30 extends through the mounting bracket 38, through the electric machine stator 10, and engages the second internal wall 14 of the housing 12 to secure the electric machine stator 10 to the housing 12 and within the cavity 18. The mounting bracket 38 may define a second plurality of through holes 46 that are each configured to align with one of the plurality of through holes 28 defined in the laminate plates 24 of the electric machine stator 10, and to align with one of the plurality of tapped holes 32 defined in the rear wall 14 of the housing 12. More specifically, the metallic inner ring 42 of the mounting bracket 38 may define the second plurality of through holes 46. Each of the fasteners 30 may extend through one of the through holes 46, one of the through holes 28, and engage the tapped holes 32 to secure the electric machine stator 10 to the housing 12 and within the cavity 18. More specifically, the fasteners 30 may secure the electric machine stator 10 to both the rear wall 14 of the housing 12 and to the mounting bracket 38 such that the electric machine stator 10 is "sandwiched" between the rear wall 14 of the housing 12 and the mounting bracket 38 and such that the electric machine stator 10 is supported at both the first longitudinal end 34 and the second longitudinal end 36.

The mounting bracket 38 and the internal side wall 16 of the housing 12 may form an interference-fit or press-fit engagement. More specifically, an external peripheral surface 48 of the elastomer outer ring (the elastomer outer ring comprising the elastic outer portion 40 of the mounting bracket 38) may engage the internal side wall 16 of the housing 12 such that an interference-fit or press-fit is formed between the external peripheral surface 48 of the of the elastomer outer ring and the internal side wall 16 of the housing 12 (i.e., the external peripheral surface 48 of the elastomer outer ring may have a larger outer perimeter or outer diameter relative to the perimeter or diameter of the cavity 18 at the position where the external peripheral surface 48 engages the side wall 16 of the housing 12).

The internal side wall 16 may define an annular groove 50. The external peripheral surface 48 of the of the elastomer outer ring (the elastomer outer ring comprising the elastic outer portion 40 of the mounting bracket 38) may engage the internal side wall 16 within the annular groove 50. More specifically, the external peripheral surface 48 of the of the elastomer outer ring may engage the internal side wall 16 such that an interference-fit or press-fit is formed between the external peripheral surface 48 of the of the elastomer outer ring and the internal side wall 16 of the housing 12 within the annular groove 50. The annular groove 50 may function to retain and prevent movement of the mounting bracket 38 longitudinally along the axis of rotation 26.

Components of the mounting bracket 38 may be tuned to reduce vibrations at specific frequencies depending on the application. For example, electric machines that are utilized to propel a vehicle may experience excessive noise and/or vibrations at specific frequencies (e.g., 400 Hz). The mounting bracket 38 may be tuned to the specific frequency to reduce the noise and vibrations by adjusting or selecting a Shore hardness of the elastomer outer ring that comprises the elastic outer portion 40 of the mounting bracket 38. Specifically, the elastomer outer ring may have a type A Shore hardness value that ranges between 30 and 100.

The mounting bracket 38 may be further tuned to the specific frequency to reduce the noise and vibrations by introducing cavities or voids into the elastomer outer ring that comprises the elastic outer portion 40 of the mounting bracket 38. Introducing cavities or voids into the elastomer outer ring may be utilized to locally fine tune the stiffness of the elastomer outer ring, which may be particularly advantageous near or proximate to the fasteners 30. The elastomer outer ring that comprises the elastic outer portion 40 of the mounting bracket 38 may specifically define a plurality of orifices 52 that extend radially between the metallic inner ring 42 and the external peripheral surface 48 of the of the elastomer outer ring. Alternatively, the plurality of orifices 52 may be extend annularly within the elastomer outer ring.

In the second mounting arrangement, the first longitudinal end 34 of the electric machine stator 10 is anchored or grounded to the housing 12 via the fasteners 30 while the second longitudinal end 36 of the electric machine stator 10 is anchored or grounded to the housing 12 via the fasteners 30 and the support plate 38. Such a configuration, where both longitudinal ends 34, 36 of the electric machine stator 10 are anchored or grounded to the housing 12, reduces the NVH issues that may arise when compared to anchoring or grounding the electric machine stator 10 to the housing 12 in a cantilevered fashion as depicted in FIGS. 1 and 2. Furthermore, the metallic inner ring 42 of the support bracket 38 provides a rigid platform for the stator 10 to be mounted to while the elastic outer portion 40 is tuned to absorb vibrations and noise in order to reduce NVH issues. It should be understood that the designations of first, second, third, fourth, etc. for through holes, walls, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle transaxle comprising:
   a housing having first and second internal walls that define a cavity;
   an electric machine stator disposed within the cavity;
   a mounting bracket disposed within the cavity and having an elastic outer portion that engages the first internal wall, wherein the stator is disposed between the mounting bracket and the second internal wall; and
   fasteners extending through the mounting bracket and stator and engaging the second internal wall to secure the stator to the housing, wherein the mounting bracket includes a metallic inner ring that engages the fasteners and an elastomer outer ring that comprises the elastic outer portion.

2. The vehicle transaxle of claim 1, wherein the elastomer outer ring includes an external peripheral surface that engages the first internal wall such that an interference-fit is formed between the external peripheral surface and the first internal wall.

3. The vehicle transaxle of claim 1, wherein the first internal wall defines an annular groove and the elastomer outer ring includes an external peripheral surface that engages the first internal wall within the annular groove.

4. The vehicle transaxle of claim 1, wherein the elastomer outer ring has a type A Shore hardness value that ranges between 50 and 80.

5. The vehicle transaxle of claim 1, wherein the elastomer outer ring defines a plurality of orifices that are adjacent to the fasteners.

6. The vehicle transaxle of claim 1, wherein the metallic inner ring defines a first set of through holes, the stator defines a second set of through holes, and the second internal wall defines a set of tapped holes, and wherein each of fasteners extend through one of the through holes of the first set of through holes, one of the through holes of the second set of through holes, and engages one of the tapped holes to secure the stator to the housing.

7. A vehicle transmission comprising:
a housing having internal rear and side walls that define a cavity;
an electric machine stator disposed within the cavity;
a bracket disposed within the cavity, the bracket having a metallic inner ring and an elastomer outer ring, wherein the elastomer outer ring engages the internal side wall and the electric machine stator is disposed between the bracket and the internal rear wall; and
a plurality of fasteners extending through the metallic inner ring and stator and engaging the rear internal wall to secure the stator to the housing.

8. The vehicle transmission of claim 7, wherein the elastomer outer ring includes an external peripheral surface that engages the internal side wall such that an interference-fit is formed between the external peripheral surface and the internal side wall.

9. The vehicle transmission of claim 7, wherein the internal side wall defines an annular groove and the elastomer outer ring includes an external peripheral surface that engages the internal side wall within the annular groove.

10. The vehicle transmission of claim 7, wherein the elastomer outer ring has a type A Shore hardness value that ranges between 50 and 80.

11. The vehicle transmission of claim 7, wherein the elastomer outer ring defines a plurality of orifices that extend radially between the metallic inner ring and an external peripheral surface of the elastomer outer ring.

12. The vehicle transmission of claim 7, wherein the metallic inner ring defines a first set of through holes, the stator defines a second set of through holes, and the second internal wall defines a set of tapped holes, and wherein each of fasteners extend through one of the through holes of the first set of through holes, one of the through holes of the second set of through holes, and engages one of the tapped holes to secure the stator to the housing.

13. The vehicle transmission of claim 7, wherein the internal side wall is cylindrical in shape.

14. A vehicle transmission comprising:
a housing having an internal rear wall and cylindrical side wall that defines an annular groove;
a stator disposed within the housing; and
a mounting bracket disposed within the housing and having an elastic outer portion, wherein the stator is disposed between the internal rear wall and the mounting bracket and an external periphery of the elastic outer portion engages the internal cylindrical side wall within the annular groove, wherein the mounting bracket includes a metallic inner ring that engages fasteners and an elastomer outer ring that comprises the elastic outer portion, wherein the elastomer outer ring is disposed about the metallic inner ring.

15. The vehicle transmission of claim 14, wherein an interference-fit is formed between the external periphery and the internal cylindrical side wall.

16. The vehicle transmission of claim 14, wherein the elastomer outer ring has a type A Shore hardness value that ranges between 50 and 80.

17. The vehicle transmission of claim 14, wherein the elastomer outer ring defines a plurality of orifices that are adjacent to the fasteners.

18. The vehicle transmission of claim 14, wherein the metallic inner ring defines a first set of through holes, the stator defines a second set of through holes, and the internal rear wall defines a set of tapped holes, and wherein each of fasteners extend through one of the through holes of the first set of through holes, one of the through holes of the second set of through holes, and engages one of the tapped holes to secure the stator to the housing.

* * * * *